(12) United States Patent
Chuang et al.

(10) Patent No.: US 10,785,386 B1
(45) Date of Patent: Sep. 22, 2020

(54) DP TO HDMI CONVERTER AND ASSOCIATED SIGNAL CONVERSION METHOD

(71) Applicant: Realtek Semiconductor Corp., HsinChu (TW)

(72) Inventors: Bing-Juo Chuang, Hsinchu (TW); Meng-Chih Hseir, Taipei (TW); Cheng-Hung Wu, Taoyuan (TW); Hsiao-Pu Lin, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/718,134

(22) Filed: Dec. 17, 2019

(51) Int. Cl.
*H04N 5/06* (2006.01)
(52) U.S. Cl.
CPC ..................... *H04N 5/06* (2013.01)
(58) Field of Classification Search
CPC ........................................ H04N 5/06
See application file for complete search history.

(56) References Cited

U.S. PATENT DOCUMENTS

| | | | |
|---|---|---|---|
| 2017/0270638 A1* | 9/2017 | Kuo | G06F 3/14 |
| 2018/0286345 A1* | 10/2018 | Lee | G09G 5/006 |
| 2019/0068843 A1* | 2/2019 | Lin | H04N 5/10 |
| 2019/0279592 A1* | 9/2019 | Colenbrander | G09G 5/001 |

OTHER PUBLICATIONS

Craig Wiley,"DisplayPort Technical Overview" Jan. 10, 2011 (Year: 2011).*

* cited by examiner

*Primary Examiner* — Michael E Teitelbaum
(74) *Attorney, Agent, or Firm* — Winston Hsu

(57) ABSTRACT

The present invention provides a DP to HDMI converter, wherein the DP to HDMI converter comprises a receiving circuit, a signal converter and a transmitter. In the operations of the DP to HDMI converter, the receiving circuit is configured to receive a plurality of input signals, wherein the input signals comprise a plurality of DP signals configured to generate an image frame with variable frame rate. The signal converter is configured to receive the plurality of input signals to generate a plurality of HDMI signals, wherein the signal converter includes a synchronization signal generator for generating a vertical synchronization signal and a horizontal synchronization signal of the plurality of HDMI signals according to a portion of the input signals. The transmitter is configured to output the plurality of HDMI signals.

9 Claims, 6 Drawing Sheets ns to a DisplayPort (DP) to
DP TO HDMI CONVERTER AND ASSOCIATED SIGNAL CONVERSION METHOD

BACKGROUND OF THE INVENTION

1. Field of the Invention

The present invention relates to a DisplayPort (DP) to High Definition Multimedia Interface (HDMI) converter, and more particularly, to a DP to HDMI converter supporting an adaptive sync mechanism of the DP specification and variable refresh rate mechanism of the HDMI specification.

2. Description of the Prior Art

To solve a screen tearing issue and improve the display quality, some variable frame rate control methods such as the adaptive sync mechanism of the DP specification and variable refresh rate (VRR) mechanism of the HDMI specification are developed. In the DP specification, a vertical synchronization signal is unnecessary for the timing of an image frame; in the HDMI specification, however, the timing of the vertical synchronization signal is required to determine the parameter "Vstart" with fixed length. Therefore, how to determine the vertical synchronization signal for the HDMI signals in the DP to HDMI converter is an important topic.

SUMMARY OF THE INVENTION

It is therefore an objective of the present invention to provide a DP to HDMI converter, which can accurately determine the vertical synchronization signal for the HDMI signals, to solve the above-mentioned problems.

In one embodiment of the present invention, A DP to HDMI converter is provided, wherein the DP to HDMI converter comprises a receiving circuit, a signal converter and a transmitter. In the operations of the DP to HDMI converter, the receiving circuit is configured to receive a plurality of input signals, wherein the input signals comprise a plurality of DP signals configured to generate an image frame with variable frame rate. The signal converter is configured to receive the plurality of input signals to generate a plurality of HDMI signals, wherein the signal converter comprises a synchronization signal generator for generating a vertical synchronization signal and a horizontal synchronization signal of the plurality of HDMI signals according to a portion of the input signals. The transmitter is configured to output the plurality of HDMI signals.

In another embodiment of the present invention, a signal conversion method is provided, wherein the signal conversion method comprises the steps of: receiving a plurality of input signals, wherein the input signals comprise a plurality of DP signals configured to generate an image frame with variable frame rate; generating a plurality of HDMI signals according to the plurality of input signals, wherein a vertical synchronization signal and a horizontal synchronization signal of the plurality of HDMI signals are generated according to a portion of the input signals; and outputting the plurality of HDMI signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
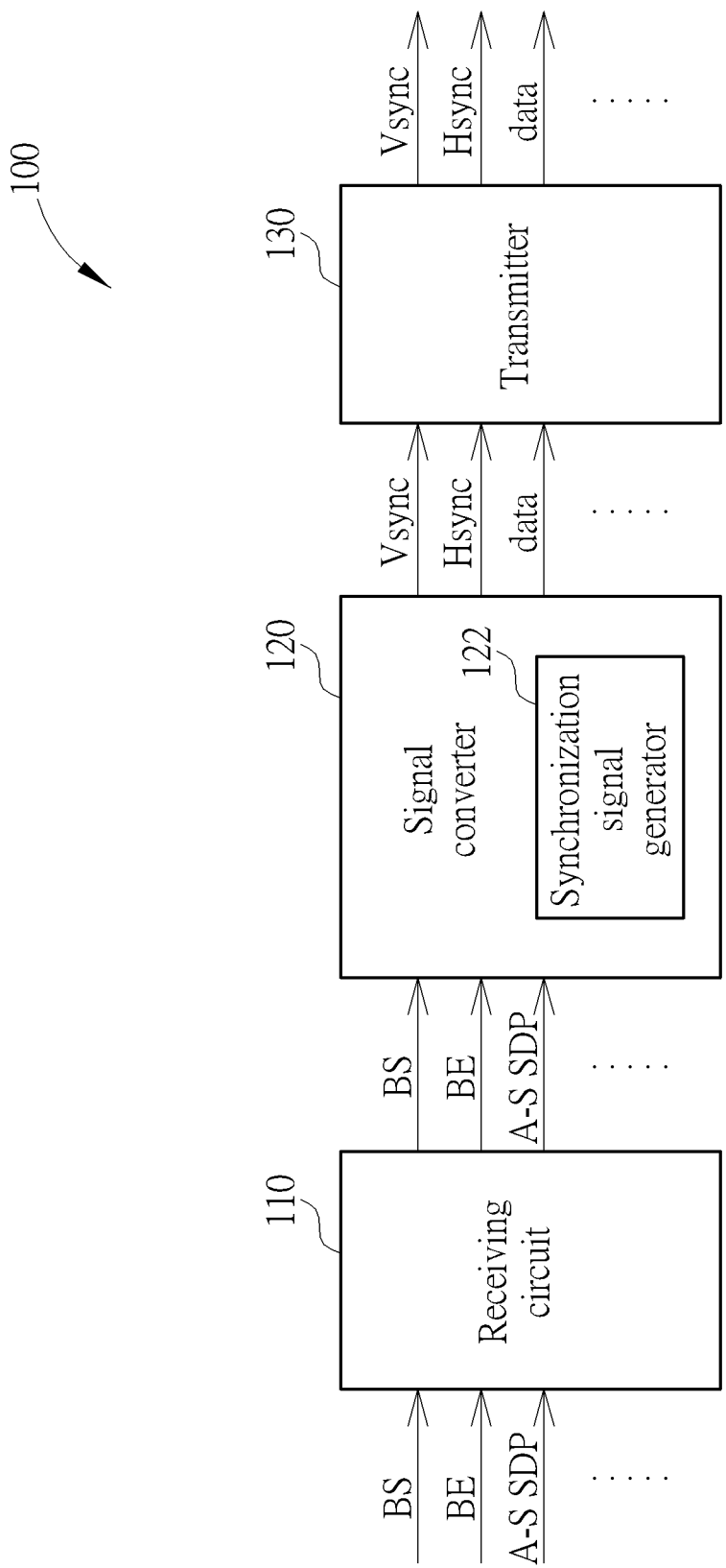
FIG. 1 is a diagram illustrating a DP to HDMI converter according to one embodiment of the present invention.

FIG. 1 is a diagram illustrating a DP to HDMI converter 100 according to one embodiment of the present invention. As shown in FIG. 1, the DP to HDMI converter 100 comprises a receiving circuit 110, a signal converter 120 and a transmitter 130, wherein the signal converter 120 comprises a synchronization signal generator 122. In this embodiment, the DP to HDMI converter 100 supports the adaptive sync mechanism of the DP specification and VRR mechanism of the HDMI specification, and the DP to HDMI converter 100 can be used in a dongle, a motherboard of a notebook or a computer, or any other electronic device capable of providing the HDMI signals to a display.

In the operations of the DP to HDMI converter 100, the receiving circuit 110 receives a plurality of DP signals comprising a blanking start (BS) signal, a blanking end (BE) signal, an adaptive-sync secondary data packet (A-S SDP) signal . . . etc., from a DP source such as a Graphics Processing Unit (GPU). In this embodiment, the DP signals are configured to generate an image frame with variable frame rate. Then, the signal converter 120 receives the DP signals to generate the video signals such as a vertical synchronization signal Vsync, a horizontal synchronization signal Hsync, and a data signal . . . etc. Finally, the transmitter 130 outputs the video signals to a display via an HDMI interface. Note that, the video signals outputted to a display via an HDMI interface are referred as HDMI signals in this disclosure.

Figure 2:
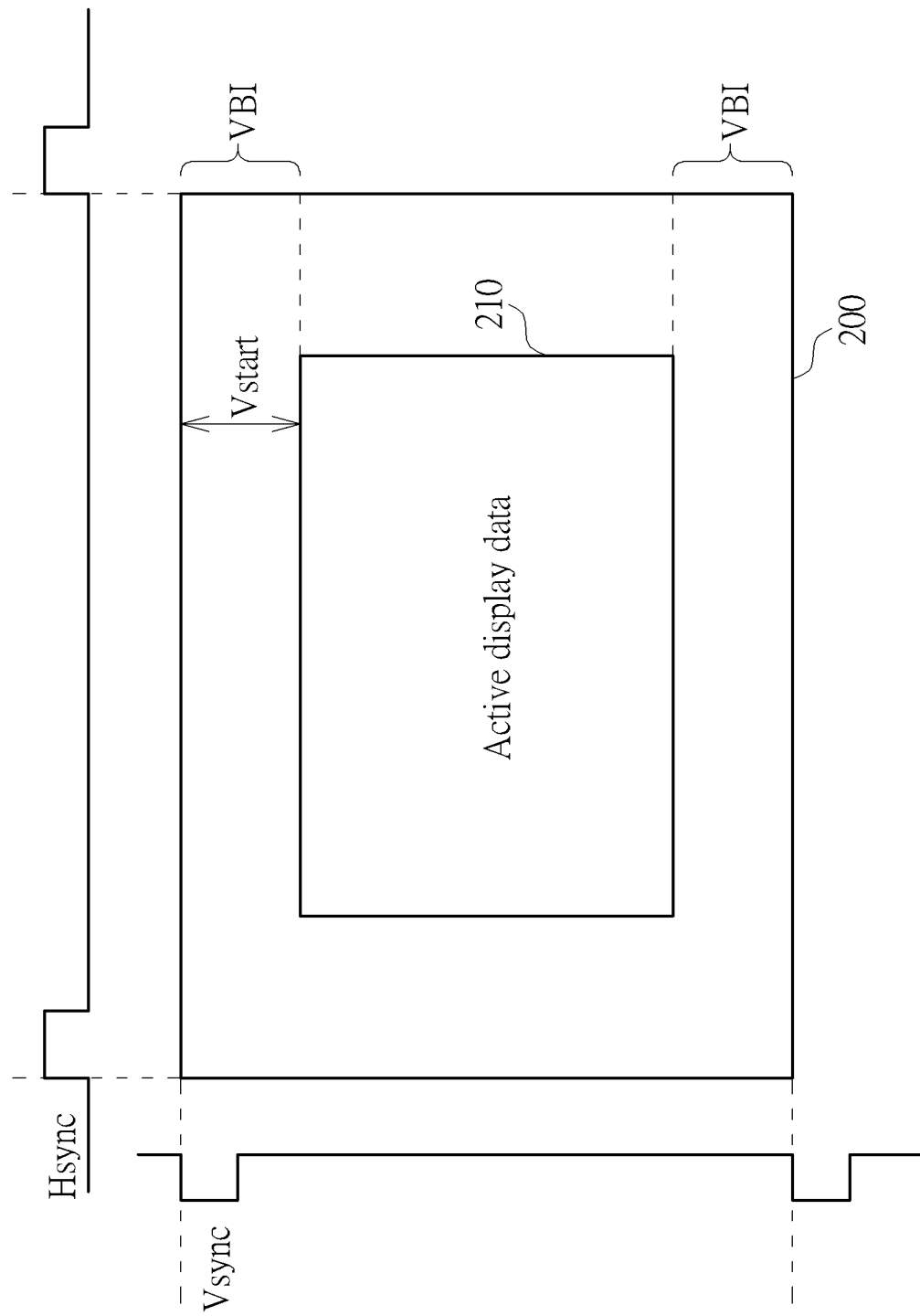
FIG. 2 shows an image frame corresponding to the HDMI specification.

FIG. 2 shows an image frame 200 corresponding to the HDMI specification. The image frame 200 comprises an active display data 210 and vertical blanking interval (VBI), wherein the active display data 210 is to be displayed on a screen of the display, and the data corresponding to the VBI is not displayed on the screen. The horizontal synchronization signal Hsync is enabled at the beginning of each horizontal line, the vertical synchronization signal Vsync is enabled at the beginning of the image frame 200, and the parameter Vstart is defined as a length from the beginning of the image frame 200 to the beginning of the active display data 210. In the HDMI specification, when the VRR mechanism is used, the horizontal lines of the VBI following the active display data 210 are increased or reduced to change the frame rate, however, because the parameter Vstart has a fixed length, the timing of the vertical synchronization signal Vsync is important for the HDMI signals. That is, the vertical synchronization signal Vsync must be enabled at the first line of the image frame 200, without being influenced by the VBI adjustment in the previous image frame. Because the embodiment shown in FIG. 1 focuses on the generation of the vertical synchronization signal Vsync and the horizontal synchronization signal Hsync, and the conversion of other signals are known by a person skilled in the art, the following descriptions only relate to the generation of the vertical synchronization signal Vsync and the horizontal synchronization signal Hsync.

In the DP 1.4a specification, the A-S SDP signal is transmitted at the first line of the image frame, so the synchronization signal generator 122 can refer to the time of the A-S SDP signal to generate the vertical synchronization signal Vsync that is aligned with the horizontal synchronization signal Hsync, so as to make the vertical synchronization signal Vsync able to be enabled at the first line of the image frame 200. In one embodiment, the horizontal synchronization signal Hsync may be generated based on the BS signal or other suitable DP signal, and the synchronization signal generator 122 can immediately generate the vertical synchronization signal Vsync that is aligned with the horizontal synchronization signal Hsync after receiving the A-S SDP signal, or the synchronization signal generator 122 can generate the vertical synchronization signal Vsync and the horizontal synchronization signal within a half of a period of a horizontal line, wherein the horizontal line defined by two adjacent BS signals of the DP signals or two adjacent horizontal synchronization signals Hsync of the HDMI signals. The timing diagram of the A-S SDP signal, the BS signals, the BE signals, the horizontal synchronization signals Hsync and the vertical synchronization signal Vsync are shown in FIG. 3, wherein the BS signal is enabled at the beginning of each horizontal line of the image frame defined by the DP specification, and the BE signal is enabled at the end of the VBI of each line having active display data.

Figure 3:
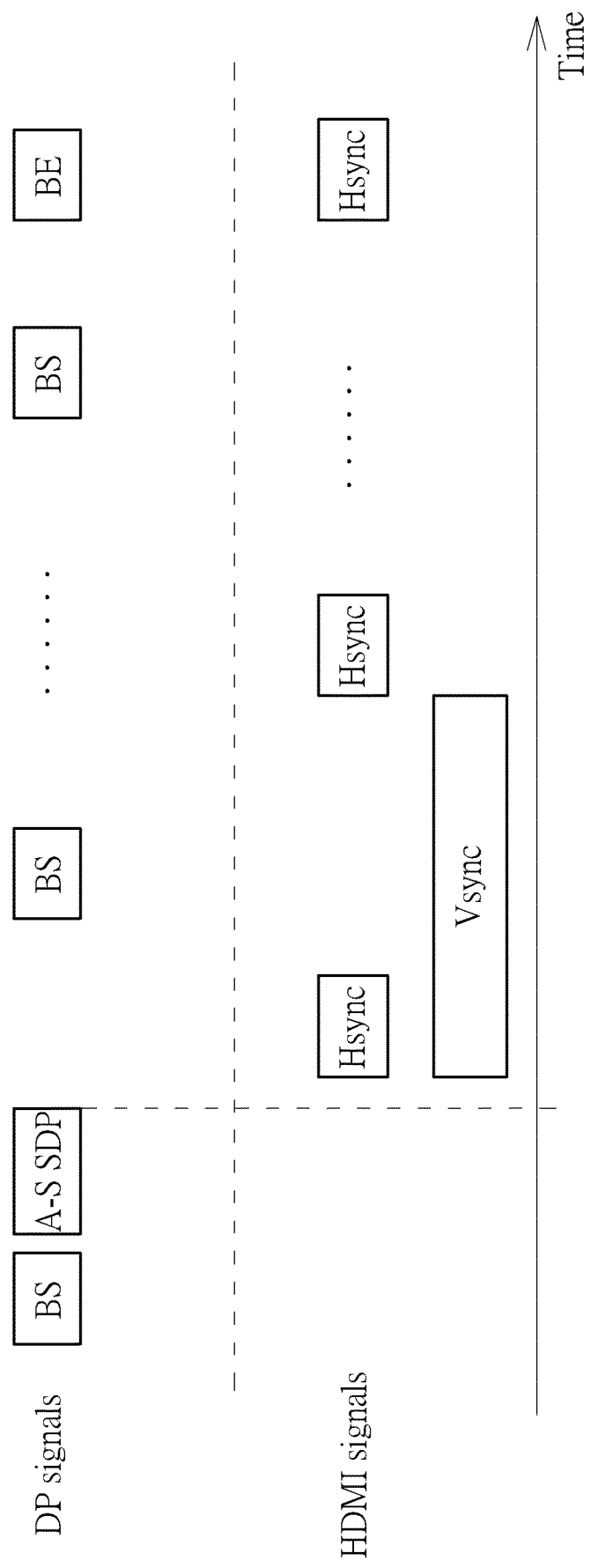
FIG. 3 shows the timing diagram of A-S SDP signal, BS signals, BE signals, horizontal synchronization signals and vertical synchronization signal.

In the embodiment shown in FIGS. 1-3, by referring to the time of the A-S SDP signal of the DP signals, the vertical synchronization signal Vsync can be precisely generated at the first horizontal line of the image frame 200, and the HDMI signals can be accurately used to generate the image frame 200 to be displayed on the display panel.

Figure 4:
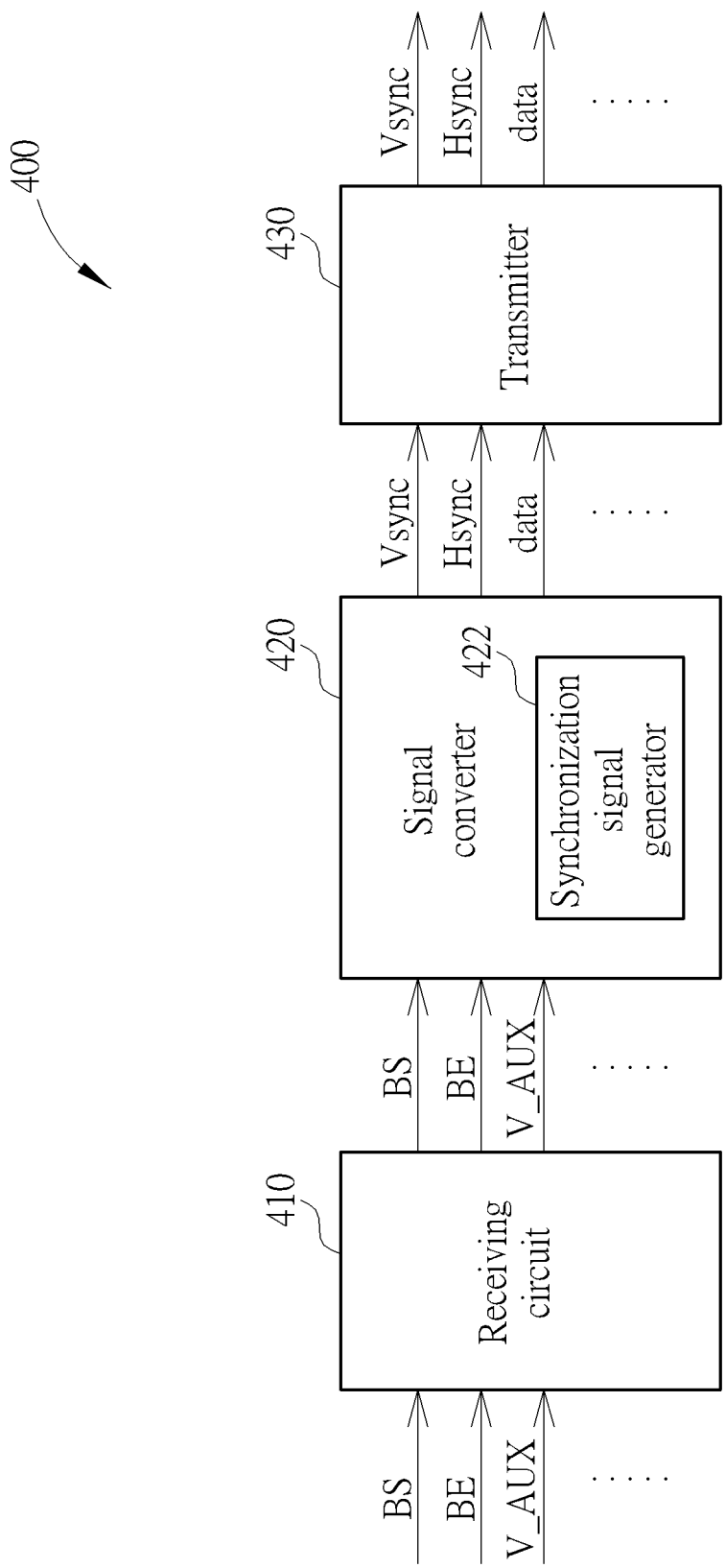
FIG. 4 is a diagram illustrating a DP to HDMI converter according to another embodiment of the present invention.

FIG. 4 is a diagram illustrating a DP to HDMI converter 400 according to another embodiment of the present invention. As shown in FIG. 4, the DP to HDMI converter 400 comprises a receiving circuit 410, a signal converter 420 and a transmitter 430, wherein the signal converter 420 comprises a synchronization signal generator 422. In this embodiment, the DP to HDMI converter 400 supports the adaptive sync mechanism of the DP specification and VRR mechanism of the HDMI specification, and the DP to HDMI converter 400 can be used in a dongle, a motherboard of a notebook or a computer, or any other electronic device capable of providing the HDMI signals to a display.

In the operations of the DP to HDMI converter 400, the receiving circuit 410 receives a plurality of DP signals and an auxiliary signal V_AUX from a DP source such as a GPU, wherein the DP signals may comprise a BS signal, a BE signal . . . etc. In this embodiment, the DP signals are configured to generate an image frame with variable frame rate. Then, the signal converter 420 receives the DP signals and the auxiliary signal V_AUX to generate the HDMI signals such as a vertical synchronization signal Vsync, a horizontal synchronization signal, and a data signal . . . etc. Finally, the transmitter 430 outputs the HDMI signals to a display via an HDMI interface.

In this embodiment, because the DP source such as the GPU exactly knows the timing of the image frames defined by the DP signals, the DP source can further generate the auxiliary signal V_AUX to the signal converter 420 at the precise time (i.e. at the beginning of the image frame 200). That is, the timing of the auxiliary signal V_AUX is similar to the timing of the A-S SDP signal described in the embodiment shown in FIG. 1 and FIG. 3. In one embodiment, the auxiliary signal V_AUX is transmitted to the signal converter 420 via a General Purpose Input/Output (GPIO) pin, and the auxiliary signal V_AUX is only used to generate the vertical synchronization signal Vsync of the HDMI signals, and the auxiliary signal V_AUX is irrelevant to the generation of the image frame by using the DP signals (i.e. the DP signals themselves can generate the image frame without using the auxiliary signal V_AUX).

In some DP specifications, there is no A-S SDP signal from the DP source, so the synchronization signal generator 422 can refer to the time of the auxiliary signal V_AUX to generate the vertical synchronization signal Vsync that is aligned with the horizontal synchronization signal Hsync, so as to make the vertical synchronization signal Vsync able to be enabled at the first line of the image frame 200. In one embodiment, the horizontal synchronization signal Hsync may be generated based on the BS signal or other suitable DP signal, and the synchronization signal generator 422 can immediately generate the vertical synchronization signal Vsync that is aligned with the horizontal synchronization signal Hsync after receiving the auxiliary signal V_AUX (for example, receiving the rising edge of the auxiliary signal V_AUX), or the synchronization signal generator 422 can generate the vertical synchronization signal Vsync and the horizontal synchronization signal within a half of a period of a horizontal line, wherein the horizontal line defined by two adjacent BS signals of the DP signals or two adjacent horizontal synchronization signals Hsync of the HDMI signals. The timing diagram of the auxiliary signal V_AUX, the BS signals, the BE signals, the horizontal synchronization signals Hsync and the vertical synchronization signal Vsync are shown in FIG. 5.

Figure 5:
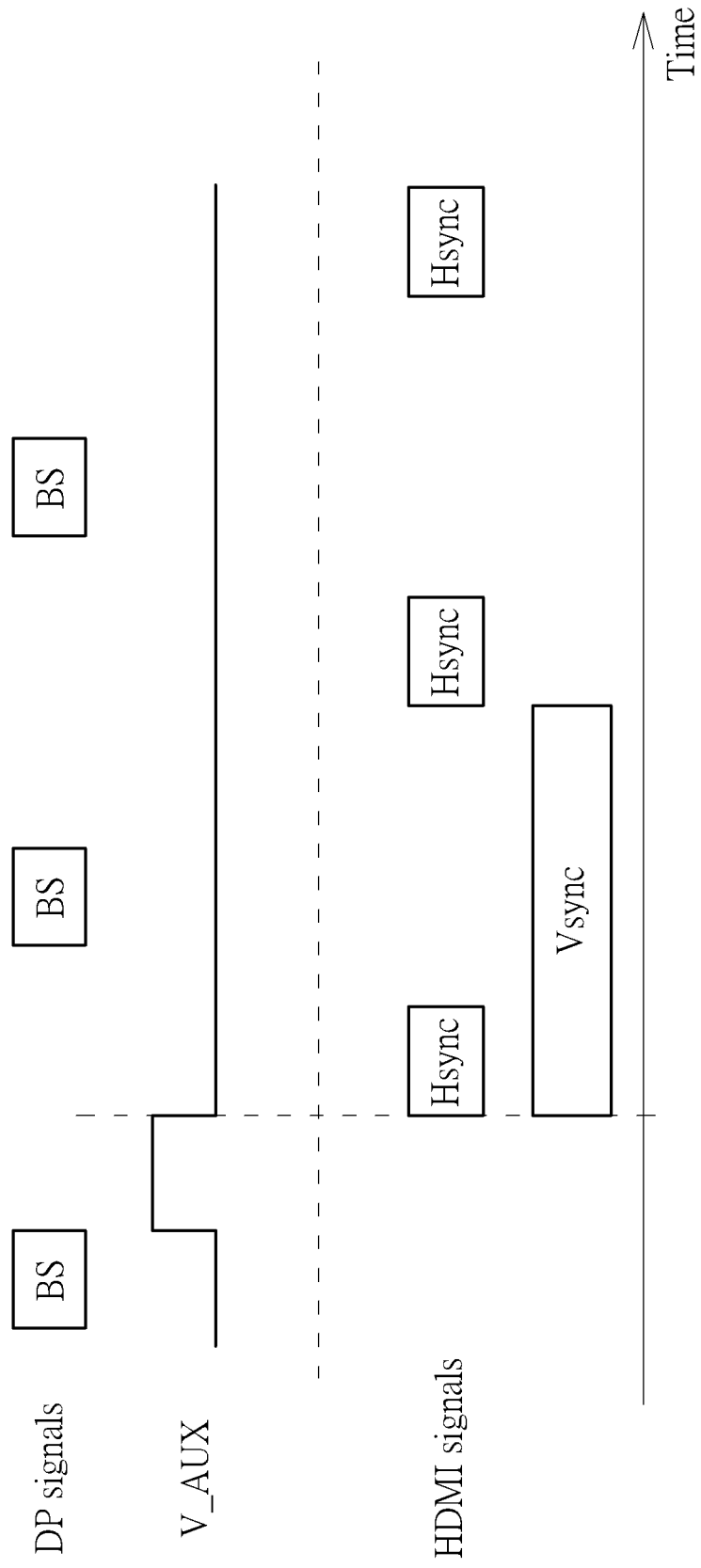
FIG. 5 shows the timing diagram of auxiliary signal, BS signals, BE signals, horizontal synchronization signals and vertical synchronization signal.

In the embodiment shown in FIGS. 4-5, by referring to the time of the auxiliary signal V_AUX, the vertical synchronization signal Vsync can be precisely generated at the first horizontal line of the image frame 200, and the HDMI signals can be accurately used to generate the image frame 200 to be displayed on the display panel.

Figure 6:
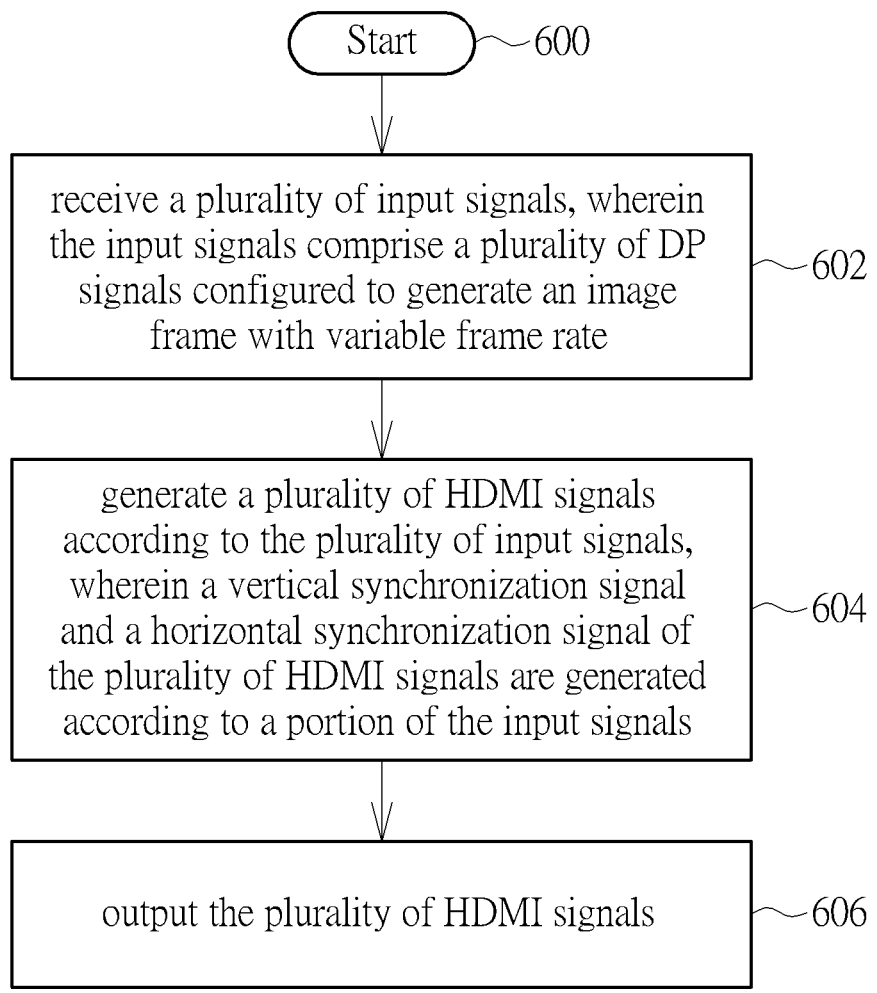
FIG. 6 is a flowchart of a signal conversion method according to one embodiment of the present invention.

FIG. 6 is a flowchart of a signal conversion method according to one embodiment of the present invention. Refer to the above embodiments together, the flow of the signal conversion method is described as follows.

Step 600: the flow starts.

Step 602: receive a plurality of input signals, wherein the input signals comprise a plurality of DP signals configured to generate an image frame with variable frame rate.

Step 604: generate a plurality of HDMI signals according to the plurality of input signals, wherein a vertical synchronization signal and a horizontal synchronization signal of the plurality of HDMI signals are generated according to a portion of the input signals.

Step 606: output the plurality of HDMI signals.

Briefly summarized, in the DP to HDMI converter of the present invention, the vertical synchronization signal of the HDMI signals can be accurately generated based on the A-S SDP signal of the DP signals or the auxiliary signal that is additionally provided by the DP source. Therefore, the HDMI signals can be accurately used to generate the image frames to be displayed on the display panel.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A DisplayPort (DP) to High Definition Multimedia Interface (HDMI) converter, comprising:
   a receiving circuit, for receiving a plurality of input signals, wherein the input signals comprise a plurality of DP signals configured to generate an image frame with variable frame rate;
   a signal converter, coupled to the receiving circuit, for receiving the plurality of input signals to generate a plurality of HDMI signals, wherein the signal converter comprises a synchronization signal generator for generating a vertical synchronization signal and a horizontal synchronization signal of the plurality of HDMI signals according to a portion of the input signals; and
   a transmitter, coupled to the signal converter, for outputting the plurality of HDMI signals;
   wherein the plurality of DP signals comprise an adaptive-sync secondary data packet (SDP) signal; and the signal converter refers a time of the adaptive-sync SDP signal to generate the vertical synchronization signal, the signal converter refers to a blanking start (BS) signal of the plurality of DP signals to generate the horizontal synchronization signal, wherein the vertical synchronization signal and the horizontal synchronization signal are generated within a half of a period of a horizontal line defined by two blanking start signals of the plurality of DP signals after receiving the adaptive-sync SDP signal.

2. A DisplayPort (DP) to High Definition Multimedia Interface (HDMI) converter, comprising:
   a receiving circuit, for receiving a plurality of input signals, wherein the input signals comprise a plurality of DP signals configured to generate an image frame with variable frame rate;
   a signal converter, coupled to the receiving circuit, for receiving the plurality of input signals to generate a plurality of HDMI signals, wherein the signal converter comprises a synchronization signal generator for generating a vertical synchronization signal and a horizontal synchronization signal of the plurality of HDMI signals according to a portion of the input signals; and
   a transmitter, coupled to the signal converter, for outputting the plurality of HDMI signals;
   wherein the plurality of input signals comprise an auxiliary signal, the signal converter refers to a time of the auxiliary signal to generate the vertical synchronization signal of the plurality of HDMI signals.

3. The DP to HDMI converter of claim 2, wherein the receiving circuit receives the auxiliary signal via a General Purpose Input/Output (GPIO) pin.

4. The DP to HDMI converter of claim 2, wherein the auxiliary signal is only used to generate the vertical synchronization signal of the plurality of HDMI signals, and the auxiliary signal is irrelevant to a generation of the image frame by using the plurality of DP signals.

5. The DP to HDMI converter of claim 2, wherein after receiving the auxiliary signal, the signal converter generates the vertical synchronization signal that is aligned with the horizontal synchronization signal.

6. A signal conversion method, comprising:
   receiving a plurality of input signals, wherein the input signals comprise a plurality of DisplayPort (DP) signals configured to generate an image frame with variable frame rate;
   generating a plurality of High Definition Multimedia Interface (HDMI) signals according to the plurality of input signals, wherein a vertical synchronization signal and a horizontal synchronization signal of the plurality of HDMI signals are generated according to a portion of the input signals; and
   outputting the plurality of HDMI signals;
   wherein the plurality of input signals comprise an auxiliary signal, and the step of generating the plurality of HDMI signals according to the plurality of input signals comprises:
   generating the vertical synchronization signal of the plurality of HDMI signals according to the auxiliary signal; and
   after receiving the auxiliary signal, generating the vertical synchronization signal that is aligned with the horizontal synchronization signal.

7. The signal conversion method of claim 6, wherein the auxiliary signal is only used to generate the vertical synchronization signal of the plurality of HDMI signals, and the auxiliary signal is irrelevant to a generation of the image frame by using the plurality of DP signals.

8. The signal conversion method of claim 6, wherein the step of receiving the plurality of input signals comprises:
   receiving the auxiliary signal via a General Purpose Input/Output (GPIO) pin.

9. The signal conversion method of claim 6, wherein the step of generating the vertical synchronization signal of the plurality of HDMI signals according to the auxiliary signal comprises:
   referring to a time of the auxiliary signal to generate the vertical synchronization signal.

* * * * *